United States Patent Office 3,395,333
Patented July 30, 1968

3,395,333
ARRANGEMENT FOR CONTROLLING THE RESISTANCE VALUE OF ENVIRONMENT-SENSITIVE RESISTANCE DEVICES
William R. Aiken, 10410 Magdalena Ave.,
Los Altos Hills, Calif. 94022
Filed May 25, 1965, Ser. No. 458,649
16 Claims. (Cl. 323—21)

ABSTRACT OF THE DISCLOSURE

A resistance varying arrangement comprising an energy-field-sensitive resistance device, means for generating an energy field of the type to which said device is sensitive located to expose said device to the generated energy field, means including a resistor connected in series with said generating means for applying a voltage to said generating means to energize said generating means to the degree whereat the resultant energy field is about to vary the resistance of said resistance device, and means connected in parallel with said resistor and in series with said field generating means for raising the state of energization of said field generating means abruptly to the degree required for setting the resistance of said device to a desired value.

The present invention relates to environment-sensitive resistance devices, i.e. devices whose resistance values change when they are exposed to energy fields, such as the devices known as "photosensitive resistors" whose resistance value depends upon the degree of illumination to which they are exposed, or "magneto-resistance devices" whose resistance value depends upon the existence and the intensity of a magnetic field. The present invention relates particularly to the arrangements for controlling the resistance value of such environment-sensitive resistance devices.

For successful use of environment-sensitive resistance devices, in electronic circuitries, their response to changes in the described environmental conditions is frequently too slow, unless they are of the high cost variety and/or unless the means for changing their environmental conditions, are operated by high voltages and are of the variety that will stand energization by high voltages, which is usually of the high cost variety.

It is an object of my invention to provide arrangements for controlling the resistance value of environment-sensitive resistance devices of the type referred to, that obtain a quick response with low voltages even though the resistance devices and the means for changing their environmental conditions are of the low cost variety.

Figure 1:
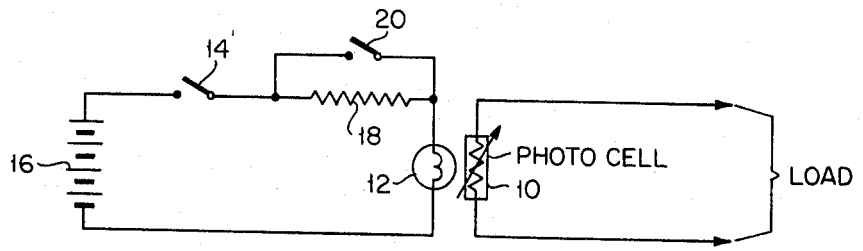
Figure 2:
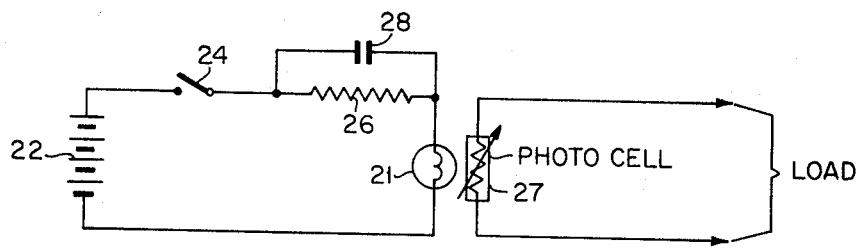
Figure 3:
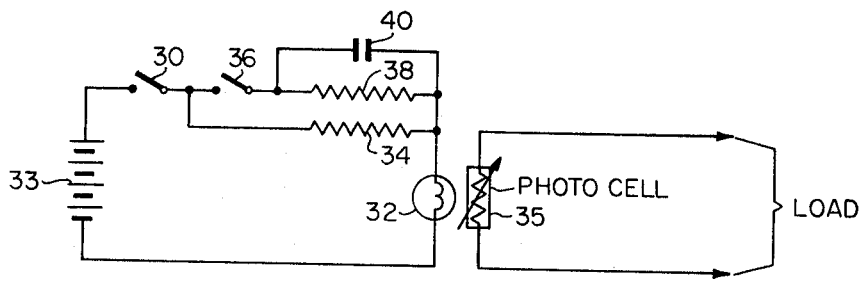
Figure 4:
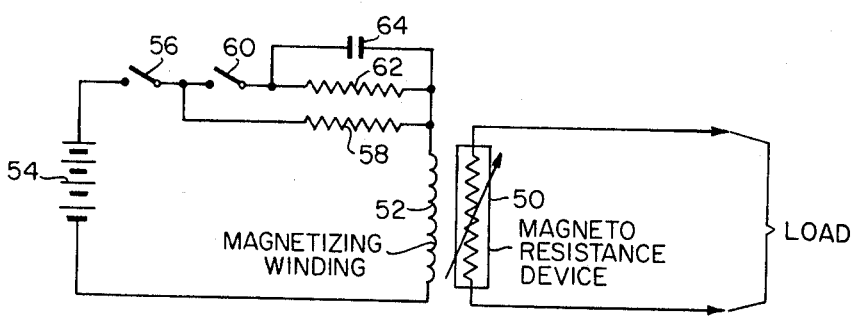

This and other objects of the present invention will be apparent from the following description of the accompanying drawings which illustrate certain preferred embodiments thereof and wherein FIGURES 1, 2, and 3 are circuit diagrams of arrangements known as photo relays wherein the resistance value of a photo cell is controlled by the degree of brightness of an adjacently positioned lamp; and FIGURE 4 is a circuit diagram similar to FIGURE 3 wherein the resistance value of a magneto-resistance device is controlled by the intensity of a magnetic field generated by an adjacently located magnetizing coil.

In accordance with the invention I bias the means for changing the environmental conditions of environment-sensitive resistance devices to a degree where they are about to effect a change or have already effected a small change, in the resistance value of the device so that any increase in the voltage applied to said means will immediately effect a marked change in the resistance value of the device. Alternatively, or additionally, I provide for a momentary current surge through said environment changing means which briefly over-voltages said means and hence creates rapidly such environmental conditions as will markedly affect the resistance value of the resistance device. Such brief overvoltaging does not appreciably affect the useful lifetime of the environment-changing means due to the brief duration of the surge to which said means are exposed. Hence, said environment-changing means may be of the low cost variety.

The invention in its simplest form is illustrated in FIGURE 1, wherein the reference numeral 10 identifies a photo-sensitive resistor, such as a solid state photo cell, that is connected across a load which may be any kind of circuitry into which the photo-sensitive resistor is connected and whose performance varies with variations in the resistance value of said resistor. The photo-sensitive resistor 10 is exposed to illumination by an adjacently located lamp 12 which may be of the low cost variety such as a common pilot lamp. The lamp 12 may be supplied with power by closure of a switch 14 from a suitable source such as the battery 16. The lamp 12 may require only very few volts to light up brightly, for instance 2 volts and accordingly, the battery 16 may be of a size to supply 2 volts. The power circuit of the lamp includes a resistor 18 in series with the lamp, which is of such size that the voltage drop across the lamp is insufficient to light the lamp to its full brightness but keeps it energized to a degre whereat it is about to light up or whereat its brightness is at a threshhold value at which the resistance value of the photo cell 10 is about to change or has changed to an insignificant degree. Shunted across the resistor 18 is an initially open switch 20. When it is desired to change the resistance value of the photo-sensitive resistor 10 quickly and significantly, the operator merely closes the switch 20, and due to the fact that the energization of the lamp 12 was held at a threshold value as described above, said lamp does not require a warming-up period before it lights up brightly, even if it is the low cost variety, but will rapidly reach its maximum brightness causing the photo-sensitive resistor 10 to respond and lower its resistance value in a minimum time even though both the lamp 12 and the resistor 10 may be of the low cost variety.

FIGURE 2 is another embodiment of the invention wherein the lamp 21 may be connected across a suitable source of power 22 by closure of a switch 24. The power circuit of the lamp includes a resistor 26 in series with the lamp. The value of resistor 26 is such that when the switch 24 is closed, the brightness of the lamp is raised to the level required to effect a desired decrease in the resistance value of the photosensitive resistor 27. For instance, if the source of power 22 supplies 6 volts and the lamp 21 requires 2 volts for normal operation, the resistor 26 is of such value as to provide a drop of 2 volts across the lamp 21. To speed up the illumination of the of the lamp 21 and the resultant decrease in the resistance value of the photo-sensitive resistor 27 achieved by closure of switch 24, the resistor 26 is shunted by a relatively small capacitor 28. Now, when the switch 24 is closed and a voltage drop of 2 volts is supplied to the lamp through resistor 26 (which would normally cause the lamp to light gradually up to the required level) a brief surge of 6 volts reaches the lamp almost instantaneously through the capacitor 28 and momentarily over-voltages the lamp 12. As a result thereof, the lamp brightens up much more rapidly than would otherwise be the case, and produces a rapid response of the photosensitive resistor 10 although the lamp and the photosensitive resistor may both be of the inexpensive, normally slow-reacting type.

The embodiment of the invention illustrated in FIGURE 3 combines the advantageous features of both the hereinbefore described embodiments of the invention. The switch 30 is arranged, upon closure, to connect the lamp 32 across a suitable source of power 33 through a resistor 34 which is dimensioned to maintain the degree of energization of the lamp 32 at a threshold value whereat the photo-sensitive resistor 35 is about to react or has already reacted to an insignificant degree. Closure of a second switch 36 is arranged to connect another resistor 38 in parallel with the resistor 34. This causes a sudden decrease in the effective resistance of the power circuit of lamp 32 and a corresponding increase in the voltage across said lamp 32, which raises the lamp rapidly to its full operating brightness in a manner similar to the manner in which closure of switch 20 in the embodiment illustrated in FIGURE 1 raised the brightness of lamp 12 from a threshold value to its full operating brightness. Additionally, however, in the embodiment of the invention illustrated in FIGURE 3, the newly introduced parallel resistor 38 is shunted by a relatively small capacitor 40 in a manner similar to the manner in which the resistor 26 of the embodiment illustrated in FIGURE 2 is by-passed by the capacitor 28. Hence, closure of the switch 36 in the embodiment of the invention illustrated in FIGURE 3 does not only raise the voltage supplied to the lamp 12 quickly from a threshold level to its normal operating level, it briefly applies the full voltage of the source of power 33 across the lamp 32 through the capacitor 40. Thus, the lamp is significantly over-voltaged for a very brief moment and its brightness rises almost instantaneous to the level required for the photo-sensitive resistor 10 to react promptly. Due to the briefness of the voltage surge supplied to the lamp 32 through the differentiating capacitor 40, however, the brightness of the lamp, though it may reach its required level almost instantaneously, will not greatly exceed said level of brightness so that the useful life time of the lamp is not significantly shortened. Upon disappearance the voltage surge passed by the capacitor 40, the increased voltage supplied to the lamp 32 through the parallel resistors 34 and 38 maintains the brightness of the lamp at its desired operating level.

The embodiment of the invention illustrated in FIGURE 3 provides another and most important advantage. The filaments of lamps of the low cost variety do not dissipate heat with sufficient speed for the lamps to dim rapidly to a desired lower level of brightness upon reduction of the voltage applied to them as effected by reopening switch 36. In some applications of photo-sensitive resistors it is desirable not only to lower the resistance value of the photo-sensitive resistor rapidly to a required level it may also be desirable to raise it rapidly to its initial value. The embodiment of the invention illustrated in FIGURE 3 and described above, provides means for undervoltaging the lamp momentarily when it is desired to return it to its threshold value of energization so that its filament may dissipate its heat more quickly than what it could if the voltage applied across the lamp were merely lowered to its threshhold value. When the switch 36 is opened while the switch 30 remains closed, the voltage applied across the lamp 12 does not only drop because of elimination of the parallel resistor 38 from the power circuit of the lamp. Disappearance of the voltage applied to the differentiating capacitor 40 as effected by the opening of switch 36, delivers a brief voltage pulse of opposite polarity to the lamp 32. Thus, the voltage across the lamp 12 drops momentarily to a lower level than the level determined by the sole presence of resistor 34 in the power circuit of the lamp 12, and the lamp is briefly undervoltaged, i.e. is briefly voltaged below the level required to maintain the energization of the lamp at the threshhold value. Thus, the filament of the lamp may cool more quickly and its brightness may dim more rapidly to the required threshhold value than would be possible if the voltage across the lamp were merely reduced to the threshhold value. Hence, the embodiment of the invention illustrated in FIGURE 3 makes it not only possible to lower the resistance of photo-sensitive resistors of the slowly reacting, low cost variety by means of low voltage lamps of the low cost variety, it also makes it possible to raise the resistance of such low cost photo-sensitive resistors with great rapidity to a predetermined initial value.

The embodiment of the invention illustrated in FIGURE 4 differs from the embodiments illustrated in FIGURES 1, 2 and 3 in that it is constructed to act upon, and operate with, a different environment-sensitive resistance device, namely, a magneto resistance device 50. Such devices are made of the same materials as the polycrystalline Hall generators, and are of a low resistance in the absence of a magnetic field, but their resistance may be increased by factors ranging from 25 to 50 when placed into a magnetic field.

Arranged adjacent the magneto-resistance device 50 is a magnetizing coil 52 which may be connected across a suitable source of power 54 by closure of a switch 56. Initially, the power circuit of the magnetizing coil includes a series resistor 58 which is of such size with regard to the voltage supplied by the source of power that the magnetic field generated by the winding 52 is at a threshold value whereat it is about to increase the resistance of the magneto-resistance device 50 or has already increased it to an insignificant degree. Closure of another initially open switch 60 is arranged to connect a second resistor 62 in parallel with resistor 58 to reduce the effective resistance in the power circuit of the magnetizing winding 52. The resultant increase in the voltage applied to the magnetizing winding 52 brings about a speedy increase in the intensity of the magnetic field generated by the magnetizing winding 50, and since the intensity of the magnetic field initially produced by the winding 52 was at a threshold value as explained above, closure of switch 60 is effective to produch a speedy increase in the resistance value of the magneto-resistance device.

A small capacitor 64 may be shunted across the resistor 62, and if such a capacitor is present in the control circuitry of the embodiment illustrated in FIGURE 4, closure of switch 60 does not only reduce the effective resistance in series with the magnetizing winding in the power circuit of said winding, but applies through said capacitor 64 a high voltage surge of brief duration to the magnetizing winding 52. As a result thereof, closure of switch 60 is effective to raise the intensity of the magnetic field generated by the winding 52 and, hence, the resistance value of the magneto-resistance device 50 almost instantaneously to a predetermined higher value; and vice versa, opening of switch 60 while switch 56 remains closed, effects a rapid drop in the intensity of the magnetic field generated by the winding 52, and hence in the resistance of the magneto-resistance device 50.

The described control circuits make it possible to vary the resistance values of environment-sensitive resistance devices, such as photo-sensitive resistors or magneto-resistance devices with low voltages such as are suitable for operation with low cost transistors, and the desired changes in the resistance values of said environment-sensitive resistance devices may be obtained rapidly even though the resistances devices themselves may be of the low cost variety which reacts slowly to changes in its environmental energy field conditions, and even though the means for varying the energy fields to which said devices are exposed, are of the slowly reacting type. Thus, it is now possible to obtain a desired change in the resistance value of photo resistors of the inexpensive kind, with a low voltage pilot lamp in a time interval of the order of milli-seconds where it required formerly a time interval of more than $\frac{1}{10}$ of a second to obtain the same resistance change.

While I have explained my invention with the aid of certain preferred embodiments thereof, it will be understood that the invention is not limited to the specific magnetizing coils, lamps or environment sensitive resistance devices described by way of example, which may be departed from without departing from the scope and spirit of the invention.

Wherever the appended claims call for means for energizing the energy field generating means to a threshold value at which the generated energy field is about to vary the resistance value of the environment sensitive resistance device, this clause is to be understood as including situations wherein a slight change in the resistance value of the environment sensitive resistance device has already occurred.

I claim:

1. A resistance varying control arrangement comprising an energy field sensitive resistance device, means for generating an energy field of the type to which said device is sensitive located to subject the device to the generated energy field, means including power supply means for energizing said field generating means to a threshold value at which the generated energy field is about to vary the resistance of said device, means including said power supply means operable to abruptly increase the state of energization of said field generating means to the degree required to set the resistance value of said device to the desired level; and means including said power supply means operative upon operation of said energization increasing means for briefly raising the state of energization of said field generating means about said required value.

2. A resistance varying arrangement comprising an energy field sensitive resistance device, means for generating an energy field of the type to which said device is sensitive located to expose said device to the generated energy field, means including a resistor connected in series with said generating means for applying a voltage to said generating means to energize said generating means to a degree whereat the resultant energy field is about to vary the resistance of said resistance device; and means connected in parallel with said resistor and in series with said generating means for applying an additional voltage to said generating means to raise its state of energization to the degree required for setting the resistance of said device to a desired value.

3. Arrangements according to claim 2 wherein said resistance device is a photo-sensitive resistor and said field-generating means is a lamp.

4. Arrangement according to claim 2 wherein said resistance device is a magneto-resistance device and said generating means is a magnetizing winding.

5. A resistance varying arrangement comprising an energy field sensitive resistance device, means for generating an energy field of the type to which said device is sensitive located to subject said device to the generated energy field, means including a first resistor for applying to said generating means a voltage energizing it to a degree whereat the resultant energy field is about to vary the resistance of said resistance device, and means for rapidly increasing the degree of energization of said generating means including a switch and a second resistor in series connected across said first resistor in series with said generating means.

6. Arrangement according to claim 5 wherein said resistance device is a photo-sensitive resistor and said field generating means is a lamp.

7. Arrangement according to claim 5 wherein said resistance device is a magneto-resistance device and said generating means is a magnetizing winding.

8. An arrangement for rapidly varying the resistance of an energy field sensitive resistance device comprising an energy field sensitive resistance device means for generating an energy field of the type to which said resistance device is sensitive located to subject said resistance device to the generated energy field, and means for energizing said field generating means including a switch and a resistor connected in series with said device and a capacitor shunted across said resistor.

9. Arrangement according to claim 8 wherein said resistance device is a photo-sensitive resistor and said field-generating means is a lamp.

10. Arrangement according to claim 8 wherein said resistance device is a magneto-resistance device and said generating means is a magnetizing winding.

11. An arrangement for rapidly changing the resistance of an energy field-sensitive resistance device to a predetermined level comprising an energy field sensitive resistance device means for generating an energy field of the type to which said device is sensitive, means including a first resistor operable to energize said field generating means to a threshold level whereat the resultant energy field is about the change the resistance value of said resistance device; and means operable for raising the degree of energization of said field generating means to a predetermined higher level whereat the resultant energy field sets the resistance of said device to a desired value, and for rapidly reducing the degree of energization of said generating means to a lower level including a switch and a second resistor connected across said first resistor in series with said field generating means and a capacitor shunted across said second resistor.

12. Arrangement for rapidly varying the resistance of an energy field-sensitive resistance device comprising an energy field sensitive resistance means for generating an energy field of the type to which said resistance device is sensitive located to subject said resistance device to the generated energy field, means including a first resistor operable to apply to said field generating means a voltage energizing said generating means to an initial degree at which the resistance of said resistance device is about to change, and means for rapidly increasing the degree of energization of said generating means to a predetermined higher degree including a switch and a second resistance connected across said first resistor, and a capacitor shunted across said secondary resistor.

13. A resistance varying arrangement comprising a photo-sensitive resistor, a lamp for illuminating said photo-sensitive resistor to reduce the resistance value thereof, and means for energizing said lamp including a switch and a first resistor connected in series with said lamp for illuminating said lamp to an initial degree of illumination whereat said photo-sensitive resistor is about to change its resistance value, and means operable to increase the degree of illumination of said lamp to a predetermined higher degree including a switch and a second resistor connected across said first resistor.

14. A resistance varying arrangement comprising a photo-sensitive resistor, a lamp for illuminating said photo-sensitive resistor to reduce the resistance value thereof, and means for energizing said lamp including a switch and a first resistor connected in series with said lamp for illuminating said lamp to an initial degree of illumination whereat said photo-sensitive resistor is about to change its resistance value, and means selectively operable to rapidly increase and decrease the degree of illumination of said lamp including a switch and a second resistor connected in series across said first resistor, and a capacitor shunted across said second resistor.

15. A resistance varying arrangement comprising a magneto-resistance device, a magnetizing winding for subjecting said device to magnetic fields, means for energizing said magnetizing winding to an initial degree whereat the resultant magnetic field is about to change the resistance value of said resistance device including a switch and a first resistor connected in series with said magnetizing winding, and means for increasing the degree of energization of said magnetizing winding to a predetermined higher degree including a switch and a second resistor connected in series across said first resistor.

16. A resistance varying arrangement comprising a magneto-resistance device, a magnetizing winding for subjecting said device to magnetic fields, means for energizing said magnetizing winding to an initial degree whereat the resultant magnetic field is about to change the resistance value of said resistance device including a switch and a first resistor connected in series with said magnetizing winding, and means operable to selectively increase and decrease the degree of energization of said magnetizing winding rapidly including a switch and a second resistor connected in series across said first resistor, and a capacitor shunted across said second resistor.

References Cited

UNITED STATES PATENTS

| | | | |
|---|---|---|---|
| 3,349,319 | 10/1967 | Aiken | 323—21 |
| 2,500,953 | 3/1950 | Libman | 323—94 |
| 3,040,241 | 6/1962 | Wunderman | 323—66 |
| 3,102,242 | 8/1963 | Matarese | 331—107 |
| 3,284,703 | 11/1966 | Brunel | 323—94 |

MILTON O. HIRSHFIELD, *Primary Examiner.*

WARREN E. RAY, *Assistant Examiner.*